United States Patent Office 2,995,597
Patented Aug. 8, 1961

2,995,597
TRICYANOMETHYL AROMATIC COMPOUNDS AND PROCESS FOR PREPARING THEM
John Kendall Williams, Wilmington, Del., assignor to E. I. du Pont de Nemours and Company, Wilmington, Del., a corporation of Delaware
No Drawing. Filed Dec. 9, 1958, Ser. No. 779,049
8 Claims. (Cl. 260—465)

This invention relates to new compounds having at least one tricyanomethyl group attached to carbon of an aromatic ring and to a process for their preparation.

Polycyano compounds are an important and interesting class of organic compounds. Many of the polycyano aliphatic compounds, such as tetracyanoethylene, undergo unusual reactions. The literature does not disclose that any attention has been directed to aromatic compounds having a tricyanomethyl group attached to nuclear carbon.

I have now found that aromatic compounds having a tricyanomethyl group directly bonded to nuclear carbon of an aromatic ring can be obtained by reacting cyanogen chloride or fluoride with an α-aromatic malononitrile in the presence of an acid acceptor.

The novel tricyanomethyl aromatic compounds of my invention are surprisingly stable. Their stability can be contrasted to that of a known aromatic compound having a tricyanomethyl group attached to a methylene group, which in turn is bonded to an aromatic ring. Such a compound, 1,1,1-tricyano-2-phenylethane [Ber. 32, 648 (1899)], is not sufficiently stable to undergo aromatic nuclear substitution reactions, e.g., nitration, whereas compounds having the tricyanomethyl group directly attached to aromatic ring are relatively stable to acidic and oxidizing conditions.

The compounds of the present invention are characterized by having at least one tricyanomethyl group attached to carbon of an aromatic ring. They can be represented by the general formula $Ar[C(CN)_3]_n$, wherein Ar is an aromatic radical and $n$ is an integer of not more than 2. By the term aromatic radical is meant aryl hydrocarbon radicals, such as, for example, phenyl and naphthyl; substituted aryl hydrocarbon radicals, such as, for example, chlorophenyl, chloronaphthyl, nitrophenyl, methoxyphenyl, and bromonaphthyl. The unsubstituted aromatic hydrocarbon radicals are particularly preferred representatives of "Ar" in the above formula.

As already indicated, the new tricyanomethyl aromatic compounds of this invention are obtained by reaction of a cyanogen halide, the halogen of said halide having an atomic number of up to and including 17, with a dicynomethyl aromatic compound in the presence of an acid acceptor, e.g., an alkali metal salt of the dicyanomethyl aromatic compound. The reaction is generally effected in the presence of an inert solvent or diluent. Suitable solvents or diluents include hydrocarbons, both aromatic and aliphatic, and ethers, e.g., diethyl ether, dioxane, and the like. The diluent is one that is an inert liquid under the reaction conditions and can be separated from the reaction product by evaporation or by removal of the desired tricyanomethyl compound by crystallization.

The reaction requires little time. In general, the reaction takes place in a few minutes to an hour or more. The time depends upon the rate at which cyanogen chloride is introduced. The temperature is preferably not higher than room temperature, with temperatures within the range of 0–30° C. conventionally employed. Cyanogen chloride is generally employed in an excess on a molar basis as compared to the dicyanomethyl aromatic compound, which may be present as its alkali metal salt, even though the reaction takes place in a molar ratio.

In the above reaction any aromatic compound having a dicyanomethyl group attached to nuclear carbon can be employed providing the cyano compound contains no other substituents that react with the acid acceptor or cyanogen halide.

When the acid acceptor is an alkali metal compound, sodium and potassium are preferred since they are readily available in the form of alkoxides and form salts with the dicyanomethyl aromatic compounds. The alkali metals are generally used as the alkoxides, although other alkaline compounds such as alkali metal fluorides and alkaline earth compounds such as calcium oxide can also be employed. Organic acid acceptors which can be employed are those which are non-reactive with cyanogen halides but which react with hydrogen fluoride or chloride, e.g., acetonitrile or unsaturated hydrocarbons such as bornylene.

Cyanogen chloride is the preferred halide reactant, although cyanogen fluoride can be employed to give satisfactory results in the process of my invention.

The dicyanomethyl aromatic compounds that can be used include, in addition to aryl malononitriles as disclosed in the following specific examples, the corresponding heterocyclic compounds having conjugated unsaturation and a dicyanomethyl group attached to nuclear carbon.

The tricyanomethyl aromatic compounds of this invention are relatively stable. They undergo nuclear substitution reactions such as nitration. As shown by Example II the corresponding next higher homolog is not sufficiently stable to undergo such a reaction.

The compounds of the present invention are of use in dyeing textiles either by themselves or in the form of derivatives. The nitro compounds are particularly useful for the direct dyeing of textiles as further shown by Example II given below. The tricyanomethyl aromatic compounds have been found useful in the hardening of steel, e.g., when benzotricyanide is volatilized and passed over a ferrous metal object heated in a hot tube to 800° C., hardening occurs. The compounds of my invention also inhibit bacterial growth; for example, *Micrococcus pyogenes*, var. *aureus* is inhibited at concentrations of above about 62.5 micrograms per milliliter of benzotricyanide while the compounds of Examples II and IV are needed in higher concentrations.

The following examples further show the preparation and properties of the compounds falling within the scope of this invention.

EXAMPLE I

*Benzotricyanide*

To a solution of 99.5 g. of phenylmalononitrile in 1300 ml. of benzene there was added 40 g. of sodium methoxide. After the slightly exothermic reaction had subsided, the mixture was stirred under reflux for 2½ hours and then allowed to stand overnight. The reaction flask was surrounded by an ice bath, and after the temperature of the reaction mixture had fallen to about 5° C., 53 g. of cyanogen chloride was introduced into the reaction mixture as rapidly as possible. The ice bath was removed and the mixture was stirred for one hour as it warmed to room temperature. The inorganic salts were removed by filtration, and the filtrate was freed of solvent. Distillation of the oil that remained afforded 91.5 g. (78%) of benzotricyanide, B.P. 87–88° C./3.3 mm.; $n_D^{25}$, 1.5087.

The proton magnetic resonance spectrum of this compound showed only one peak in a position corresponding to that of aromatic hydrogen. The ultraviolet spectrum was almost identical to that of toluene, $\lambda_{max}$ 261.5 m$\mu$ ($\epsilon$ 417).

Analysis.—Calcd. for $C_{10}H_5N_3$: C, 71.83; H, 3.01; N, 25.16; M.W., 167.16. Found: C, 72.17; H, 3.03; N, 25.66; M.W., 174, 178.

Hydrolysis of the product of this example with refluxing concentrated hydrochloric acid gave phenylacetic acid (M.P. 76–76.5° C.).

EXAMPLE II m-Nitrobenzotricyanide

Over the course of 5 minutes 33.4 g. of benzotricyanide was added to a stirred mixture of 50 ml. of fuming nitric acid and 150 ml. of concentrated sulfuric acid maintained at 0–15° C. A solid precipitated during the course of the addition. The reaction mixture was poured into one liter of ice water as soon as the addition of benzotricyanide was complete. The cream-colored, crystalline solid was collected by filtration and washed with water. The moist product was dissolved in boiling toluene, and the resulting toluene solution was decanted while still hot from a small amount of water. The hot toluene solution was dried by distillation of a small quantity of toluene, filtered, and allowed to cool. The massive prisms of m-nitrobenzotricyanide that formed were collected, washed with cold toluene, and dried at 50° C. in the vacuum oven. They weighed 32.2 g. (78%), M.P. 127.5–128.5° C.

Analysis.—Calcd. for $C_{10}H_4N_4O_2$: C, 56.60; H, 1.90; N, 26.40. Found: C, 57.07; H, 2.16; N, 26.65.

Hydrolysis of this material with concentrated hydrochloric acid gave m-nitrophenylacetic acid (M.P. 118–119° C.) which, upon oxidation with sodium dichromate, gave m-nitrobenzoic acid (M.P. 134–135° C.).

An attempt to nitrate 1,1,1-tricyano-2-phenylethane was made using the same conditions that led to the formation of m-nitrobenzotricyanide from benzotricyanide in good yield as follows:

A mixture of 2.5 ml. of fuming nitric acid and 5 ml. of concentrated sulfuric acid was cooled in an ice bath. When 1 g. of 1,1,1-tricyano-2-phenylethane was added to the cold mixed acid, the mixture turned black, copious amounts of a brown gas were evolved, and the contents of the flask were expelled by the violence of the reaction.

Use of m-nitrobenzotricyanide as a dye.—A bath of pH 3.5 was prepared from 20 mg. of m-nitrobenzotricyanide in 20 ml. of acetone, 20 mg. of "Marasperse CB," 250 ml. of water and one drop of concentrated hydrochloric acid. Samples of cloth were placed in this bath for 0.5 hour while the temperature was maintained at 70° C. They were then removed and washed by hand with soap and warm water.

| Fiber: | Color |
|---|---|
| Acetate | Pink |
| Cotton | None |
| Nylon | Dark pink |
| Silk | Beige |
| Viscose | None |
| Wool | Red-brown |

EXAMPLE III

α-Naphthotricyanide

A mixture of 10 g. of α-naphthylmalononitrile, 3 g. of sodium methoxide, and 400 ml. of dry benzene was heated under reflux for 3½ hours. It was then cooled to 5° C. in an ice bath and, with rapid stirring, 9 g. of cyanogen chloride was passed in. The mixture was filtered to remove inorganic salts, and the filtrate was freed of solvents on the steam bath. The oil that remained crystallized on cooling. Recrystallization of the crude product from cyclohexane gave 8.5 g. (75.2%) of α-napththotricyanide, M.P. 108–109° C. A sample prepared for analysis by three recrystallizations from cyclohexane was obtained as silvery flakes melting at 109–110° C. The ultraviolet spectrum of this material was essentially identical to α-methylnaphthylene, except that all the bands observed were shifted 50 A. toward the longer wave length, $\lambda_{max}$ 286.5 m$\mu$ ($\epsilon$630).

Analysis.—Calcd. for $C_{14}H_7N_3$: C, 77.41; H, 3.25; N, 19.34. Found: C, 77.65; H, 3.56; N, 19.54.

A mixture of 10.8 g. of α-naphthotricyanide, 20 ml. of concentrated sulfuric acid, 20 ml. of glacial acetic acid, and 20 ml. of water was heated under reflux for 48 hours. The hot mixture was poured into 150 ml. of cold water. The crude solid product was collected and recrystallized from ethanol-water to give 7 g. of α-naphthylacetic acid, M.P. 131–132° C. The melting point of a mixture of this material with an authentic sample of α-naphthylacetic acid was 130–132° C.

EXAMPLE IV

1,4-bis-(tricyanomethyl)benzene

A mixture of 4.1 g. of 1,4-phenylenebis-(malononitrile), 2.5 g. of sodium methoxide, and 200 ml. of dimethoxyethane was heated at reflux with stirring under nitrogen atmosphere for 7 hours. The mixture was maintained at 10° C. while 10 g. of cyanogen chloride was passed in over 10 minutes. The mixture was then allowed to warm to room temperature and was stirred for an additional 18 hours. Solid was removed from the reaction mixture by filtration, and the filtrate was evaporated to dryness to give 5.2 g. of solid residue, M.P. 215° C. After four recrystallizations from acetonitrile and two from methyl ethyl ketone, 1,4-bis-(tricyanomethyl)benzene was obtained that melted at 261–261.5° C.

Analysis.—Calcd. for $C_{14}H_4N_6$: C, 65.63; H, 1.56; N, 32.81. Found: C, 65.63; H, 1.66; N, 32.64.

EXAMPLE V

A solution of 20 g. of phenyl malononitrile in 300 ml. of benzene was boiled to remove moisture and to the cooled solution was added 8 g. of sodium methoxide. The resulting milky white slurry was stirred and heated under reflux for two and one-half hours and then cooled to 5° C. During 15 minutes, 8 g. of cyanogen fluoride was added as a gas over the surface of the liquid with stirring and ice cooling. The ice bath was then removed and the mixture allowed to warm to room temperature during one hour. The yellow reaction mixture was filtered through a filter aid ("Celite"), the filtrate was concentrated under reduced pressure and the greenish fluid residue was distilled to give 18 g. (75%) of water-white benzotricyanide, B.P. 87–82° C./2 mm.; $n_D^{25}$, 1.5095–1.5100.

EXAMPLE VI

To a solution of 15 g. of phenyl malononitrile in 150 ml. of acetonitrile was added 12 g. of finely divided sodium fluoride and the slurry was cooled to 5–10° C. The ractor was provided with a solid carbon dioxide-cooled reflux condenser and 7 g. of cyanogen fluoride was added as a gas over the surface of the stirred liquid. A slight exothermic effect was noted during the addition of the cyanogen fluoride. The mixture was stirred at room temperature for three hours, then filtered and the yellow filtrate concentrated under reduced pressure. The yellow residue was distilled to give the 16 g. (90%) of water-white benzotricyanide, B.P. 88–96° C./2–3 mm.; $n_D^{25}$, 1.5108–1.5183.

When the preceding general procedure was repeated except that ether was used instead of acetonitrile and no sodium fluoride was present, substantially all of the phenyl malononitrile was recovered.

EXAMPLE VII

To a solution of 15 g. of phenyl malononitrile in 150 ml. of acetonitrile cooled in an ice bath was added 6 g. of cyanogen fluoride as a gas over the surface of the stirred liquid. The ice bath was removed and the mixture was allowed to warm to room temperature overnight.

The solution was concentrated under reduced pressure and the residue distilled to give 16 g. (90%) of water-white benzotricyanide, B.P. 88–92° C./2–3 mm.; $n_D^{25}$, 1.5100–1.5183.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. An aromatic hydrocarbon having from 1–2 tricyanomethyl radicals directly attached to nuclear carbon of an aromatic carbocyclic ring, the total number of carbon atoms, exclusive of said tricyanomethyl radicals, present in said hydrocarbon being 6–10.

2. A compound of the formua

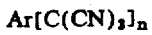

wherein Ar represents an aromatic radical selected from the class consisting of phenyl, naphthyl, chlorophenyl, chloronaphthyl, nitrophenyl, and methoxyphenyl, and $n$ is an integer of 1–2, the tricyanomethyl substituent being directly attached to nuclear carbon of said aromatic radical.

3. Benzotricyanide.
4. m-Nitrobenzotricyanide.
5. α-Naphthotricyanide.
6. 1,4-bis(tricyanomethyl)benzene.
7. A process which comprises treating at a temperature of from 0–30° C. a cyanogen halide selected from the class consisting of cyanogen fluoride and cyanogen chloride with an α-aromatic malononitrile having the α-carbon of said nitrile directly bonded to nuclear carbon of an aromatic carbocyclic ring of 6–10 carbon atoms, said treatment being effected in the presence of an acid acceptor selected from the class consisting of alkali metal salts of said α-aromatic malononitrile, alkali metal alkoxides, alkali metal fluorides, calcium oxide, acetonitrile and bornylene, to produce a compound of claim 1.

8. A process of claim 7 in which the reactant is effected in the presence of an inert diluent.

References Cited in the file of this patent

UNITED STATES PATENTS 2,688,631   Toland _____ Sept. 7, 1954

OTHER REFERENCES

Beilsteins Handbuch Der Organischen Chemis, volume 9, 2nd Supplement, 1949, page 713 (System No. 1008).

UNITED STATES PATENT OFFICE
CERTIFICATION OF CORRECTION

Patent No. 2,995,597 　　　　　　　　　　　　　　　　　　August 8, 1961

John Kendall Williams

It is hereby certified that error appears in the above numbered patent requiring correction and that the said Letters Patent should read as corrected below.

Column 4, line 49, for "87-82° C." read -- 87-92° C. --; line 64, for "1.5108-1.5183" read -- 1.5108-1.5162 --; column 6, line 24, for "Ghemis" read -- Chemie --.

Signed and sealed this 10th day of April 1962.

(SEAL)
Attest:

ERNEST W. SWIDER　　　　　　　　　　　　　　　　DAVID L. LADD
Attesting Officer　　　　　　　　　　　　　　　　Commissioner of Patents